US012424206B2

(12) United States Patent
Qiu et al.

(10) Patent No.: US 12,424,206 B2
(45) Date of Patent: Sep. 23, 2025

(54) CONTEXT-AWARE NEURAL CONFIDENCE ESTIMATION FOR RARE WORD SPEECH RECOGNITION

(71) Applicant: Google LLC, Mountain View, CA (US)

(72) Inventors: David Qiu, Fremont, CA (US); Tsendsuren Munkhdalai, Mountain View, CA (US); Yanzhang He, Mountain View, CA (US); Khe Chai Sim, Dublin, CA (US)

(73) Assignee: Google LLC, Mountain View, CA (US)

( * ) Notice: Subject to any disclaimer, the term of this patent is extended or adjusted under 35 U.S.C. 154(b) by 291 days.

(21) Appl. No.: 18/340,175

(22) Filed: Jun. 23, 2023

(65) Prior Publication Data

US 2024/0029720 A1  Jan. 25, 2024

Related U.S. Application Data

(60) Provisional application No. 63/369,215, filed on Jul. 22, 2022.

(51) Int. Cl.
*G10L 15/16* (2006.01)
*G10L 15/02* (2006.01)
(Continued)

(52) U.S. Cl.
CPC .............. *G10L 15/16* (2013.01); *G10L 15/02* (2013.01); *G10L 15/063* (2013.01); *G10L 15/19* (2013.01); *G10L 15/22* (2013.01)

(58) Field of Classification Search
CPC ....... G10L 15/16; G10L 15/02; G10L 15/063; G10L 15/19; G10L 15/22; G10L 15/1815; G10L 15/06
See application file for complete search history.

(56) References Cited

U.S. PATENT DOCUMENTS 11,615,799 B2 * 3/2023 Zhu ................. G06F 16/345
                                                    704/235
11,908,454 B2 * 2/2024 Thomas ................ G10L 15/02
(Continued)

OTHER PUBLICATIONS

International Search Report and Written Opinion for the related Application No. PCT/US2023/026048 dated Sep. 4, 2023, 43 pages.

(Continued)

*Primary Examiner* — Michael Colucci
(74) *Attorney, Agent, or Firm* — Honigman LLP; Brett A. Krueger; Grant Griffith

(57) ABSTRACT

An automatic speech recognition (ASR) system that includes an ASR model, a neural associative memory (NAM) biasing model, and a confidence estimation model (CEM). The ASR model includes an audio encoder configured to encode a sequence of audio frames characterizing a spoken utterance into a sequence of higher-order feature representations, and a decoder configured to receive the sequence of higher-order feature representations and output a final speech recognition result. The NAM biasing model is configured to receive biasing contextual information and modify the sequence of higher-order feature representations based on the biasing contextual information to generate, as output, biasing context vectors. The CEM is configured to compute a confidence of the final speech recognition result output by the decoder. The CEM is connected to the biasing context vectors generated by the NAM biasing model.

20 Claims, 6 Drawing Sheets

(51) Int. Cl.
   *G10L 15/06* (2013.01)
   *G10L 15/19* (2013.01)
   *G10L 15/22* (2006.01)

(56) References Cited

U.S. PATENT DOCUMENTS

| | | | |
|---|---|---|---|
| 11,978,435 B2* | 5/2024 | Hori | G10L 15/16 |
| 2020/0402501 A1* | 12/2020 | Prabhavalkar | G10L 15/187 |
| 2021/0183373 A1* | 6/2021 | Moritz | G06N 3/045 |
| 2021/0350786 A1* | 11/2021 | Chen | G10L 13/08 |
| 2024/0021190 A1* | 1/2024 | Biadsy | G10L 15/063 |

OTHER PUBLICATIONS

Munkhdalai Tsendsuren et al: "Fast Contextual Adaptation with Neural Associative Memory for On-Device Personalized Speech Recognition", ICASSP 2022-2022 IEEE International Conference on Acoustics, Speech and Signal Processing (ICASS.P), IEEE, May 23, 2022 (May 23, 2022), pp. 6632-6636, XP034156811, DOI: 10.1109/ICASSP43922.2022.9747726 [retrieved on 202?-04-27], 5 pages.

Qiu David et al: "Learning Word-Level Confidence for Subword End-To-End ASR", ICASSP 2021-2021 IEEE International Conference on Acoustics, Speech and Signal Processing (ICASSP), IEEE, Jun. 6, 2021 (Jun. 6, 2021), pp. 6393-6397, XP033955317, DOI: 10.1109/ICASSP39728.2021.9413966 [retrieved on Apr. 22, 2021], 5 pages.

Arun Narayanan et al: "Cascaded encoders for unifying streaming and non-streaming ASR", arxiv.org, Cornell University Library, 201 Olin Library Cornell University Ithaca, NY 14853, Oct. 27, 2020 (2020-i 0-27), XP081802570, 5 pages.

Li Qiujia et al: "Confidence Estimation for Attention-Based Sequence-to-Sequence Models for Speech Recognition", ICASSP 2021-2021 IEEE International Conference on Acoustics, Speech and Signal Processing (ICASSP), IEEE, Jun. 6, 2021 (Jun. 6, 2021), pp. 6388-6392, XP033954852, DOI: 10.1109/ICASSP39728.2021.9414920 [retrieved on Apr. 22, 2021], 5 pages.

Qiu David et al: "Context-Aware Neural Confidence Estimation for Rare Word Speech Recognition", 2022 IEEE Spoken Language Technology Workshop (S.LT), IEEE, Jan. 9, 2023 (Jan. 9, 2023), pp. 31-37, XP034281715, DOI: 10.1109/SLT54892.2023.10023411 [retrieved on Jan. 27, 2023], 7 pages.

* cited by examiner

CONTEXT-AWARE NEURAL CONFIDENCE ESTIMATION FOR RARE WORD SPEECH RECOGNITION

CROSS-REFERENCE TO RELATED APPLICATION(S)

This U.S. patent application claims priority under 35 U.S.C. § 119(e) to U.S. Provisional Application 63/369,215, filed on Jul. 22, 2022. The disclosure of this prior application is considered part of the disclosure of this application and is hereby incorporated by reference in its entirety.

TECHNICAL FIELD

This disclosure relates to context-aware neural confidence estimation for rare word speech recognition

BACKGROUND

Modern automated speech recognition (ASR) systems focus on providing not only quality/accuracy (e.g., low word error rates (WERs)), but also low latency (e.g., a short delay between the user speaking and a transcription appearing). Moreover, when using an ASR system today there is a demand that the ASR system decode utterances in a streaming fashion that corresponds to displaying a transcription of an utterance in real-time, or even faster than real-time, as a user speaks. To illustrate, when an ASR system is deployed on a mobile phone that experiences direct user interactivity, an application on the mobile phone using the ASR system may require the speech recognition to be streaming such that words, word pieces, and/or individual characters appear on the screen as soon as they are spoken. Here, it is also likely that the user of the mobile phone has a low tolerance for latency. Due to this low tolerance, the speech recognition strives to run on the mobile device in a manner that minimizes an impact from latency and inaccuracy that may detrimentally affect the user's experience.

SUMMARY

One aspect of the disclosure provides an automatic speech recognition (ASR) system that includes an ASR model, a neural associative memory (NAM) biasing model, and a confidence estimation model (CEM). The ASR model includes an audio encoder configured to encode a sequence of audio frames characterizing a spoken utterance into a sequence of higher-order feature representations, and a decoder configured to receive the sequence of first higher-order feature representations and output a final speech recognition result. The NAM biasing model is configured to receive biasing contextual information and modify the sequence of higher-order feature representations based on the biasing contextual information to generate, as output, biasing context vectors to encourage the decoder to recognize biasing phrases indicated by the biasing contextual information. The CEM is configured to compute a confidence of the final speech recognition result output by the decoder. The CEM is connected to the biasing context vectors generated by the NAM biasing model.

Implementations of the disclosure may include one or more of the following optional features. In some implementations, the NAM neural biasing model and the CEM are trained separately. For instance, the CEM may be trained on training biasing context vectors that correspond to higher-order feature representations encoded by the audio encoder from input audio frames that have been modified by the NAM biasing model based on biasing contextual information extracted from training utterances for input to the NAM biasing model. The biasing phrases may include rare words and out-of-vocabulary (OOV) terms not used to train the audio encoder and the decoder.

In some examples, the NAM biasing model is initially trained on top of the ASR model and the CEM is trained on training data on top of the initially trained NAM neural biasing model. In these examples, the CEM may randomly sample contextual information from the training data.

The audio encoder may include a cascaded encoder architecture having a causal encoder and a non-causal encoder. The audio encoder may include a stack of multi-head attention layers such as a stack of conformer layers or transformer layers. Additionally or alternatively, the CEM may include a multi-headed attention block having self-attention and acoustic cross-attention.

Another aspect of the disclosure provides a computer-implemented method when executed on data processing hardware causes the data processing hardware to perform operations that include receiving a sequence of acoustic frames characterizing an utterance spoken by a user, receiving biasing contextual information and performing, using an automatic speech recognition (ASR) model, speech recognition on the sequence of acoustic frames by: generating, by an audio encoder of the ASR model, a sequence of higher-order feature representations each associated with a corresponding acoustic frame in the sequence of acoustic frames; modifying, by a neural associative memory (NAM) biasing model, using the biasing contextual information, the sequence of higher-order feature representations to generate a corresponding sequence of biasing context vectors; and based on the biasing context vectors, generating, by a decoder of the ASR model, a sequence of hypothesized sub-word units corresponding to a final speech recognition result for the utterance, the sequence of hypothesized sub-word units forming one or more words of the utterance. Here, each hypothesized sub-word unit is output from the decoder at a corresponding output step. Based on the biasing context vectors, the operations also include generating, using a confidence estimation model (CEM), a respective confidence output score for each corresponding sub-word unit in the sequence of hypothesized sub-word units.

This aspect may include one or more of the following optional features. In some implementations, the biasing context vectors encourage the decoder to recognize any biasing phrases indicated by the biasing contextual information and the biasing phrases include rare words and out-of-vocabulary (OOV) terms not used to train the audio encoder and the decoder. In some examples, the NAM neural biasing model and the CEM are trained separately. For instance, the CEM may be trained on training biasing context vectors that correspond to higher-order feature representations encoded by the audio encoder from input audio frames that have been modified by the NAM biasing model based on biasing contextual information extracted from training utterances for input to the NAM biasing model.

In some examples, the NAM biasing model is initially trained on top of the ASR model and the CEM is trained on training data on top of the initially trained NAM neural biasing model. In these examples, the CEM may randomly sample contextual information from the training data.

The audio encoder may include a cascaded encoder architecture having a causal encoder and a non-causal encoder. The audio encoder may include a stack of multi-head attention layers such as a stack of conformer layers or transformer layers.

In some implementations, the operations also include: for each of the one or more words formed by the sequence of hypothesized sub-word units, determining a respective word-level confidence score for the word, the respective word-level confidence score equal to the respective confidence output score generated for the final sub-word unit in the word; and determining an utterance-level confidence score for the speech recognition result by aggregating the respective word-level confidence scores determined for the one or more words of the utterance. The sub-word units may include wordpieces.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
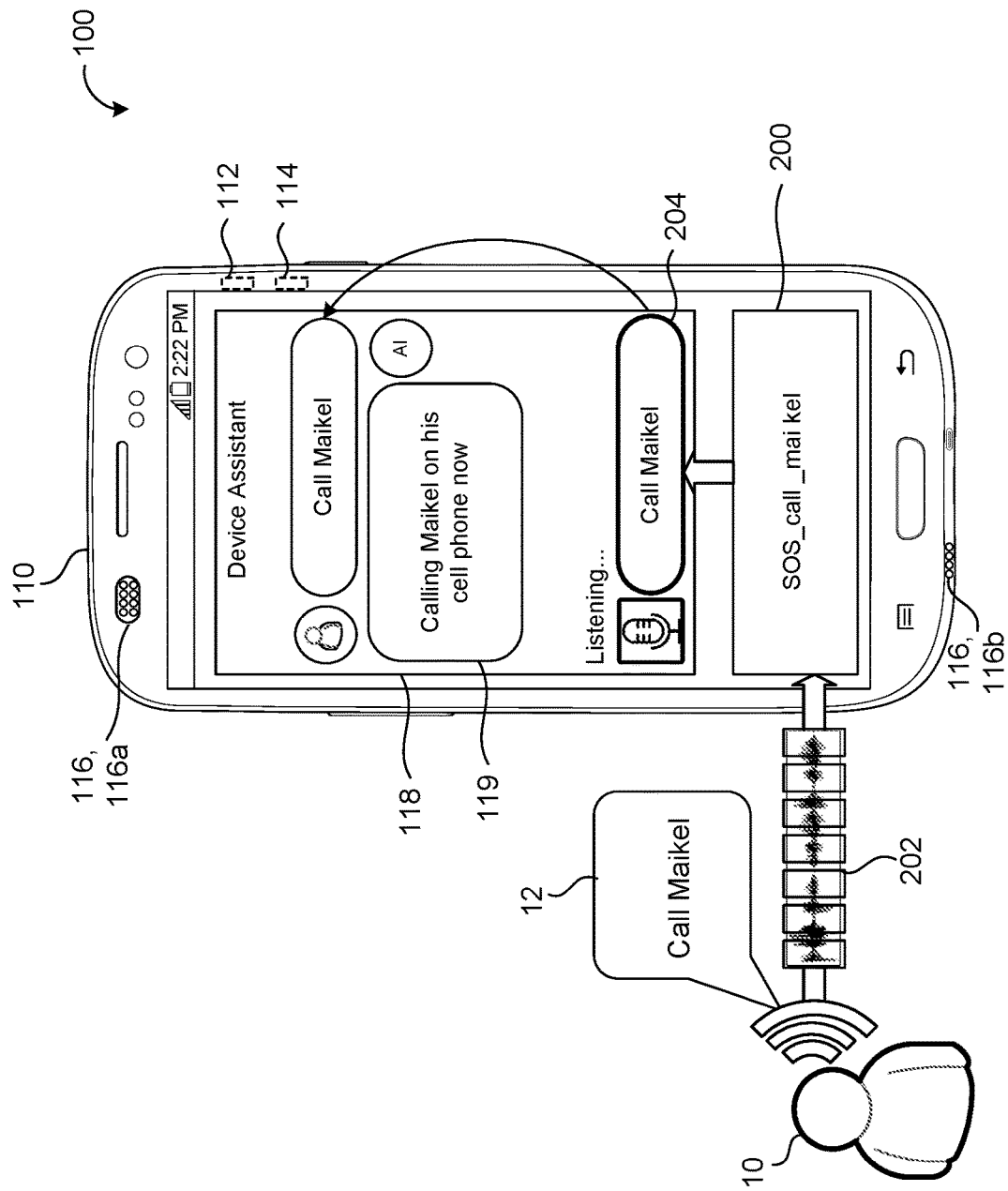
FIG. 1 is a schematic view of an example speech environment.

Automated speech recognition (ASR) systems focus on providing not only quality/accuracy (e.g., low word error rates (WERs)), but also low latency (e.g., a short delay between the user speaking and a transcription appearing). Recently, end-to-end (E2E) ASR models, such as the Recurrent Neural Network-Transducer (RNN-T), the transformer or conformer transducer, and attention-based encoder-decoder models, have gained popularity in achieving state-of-the-art performance in accuracy and latency. In contrast to conventional hybrid ASR systems that include separate acoustic, pronunciation, and language models, E2E models apply a sequence-to-sequence approach to jointly learn acoustic and language modeling in a single neural network that is trained end to end from training data, e.g., utterance-transcription pairs.

Examples of sequence-to-sequence models include "attention-based" models and "listen-attend-spell" (LAS) models. A LAS model transcribes speech utterances into characters using a listener component, an attender component, and a speller component. Here, the listener is a recurrent neural network (RNN) encoder that receives an audio input (e.g., a time-frequency representation of speech input) and maps the audio input to a higher-level feature representation. The attender attends to the higher-level feature to learn an alignment between input features and predicted subword units (e.g., a grapheme or a wordpiece). The speller is an attention-based RNN decoder that generates character sequences from the input by producing a probability distribution over a set of hypothesized words. With an integrated structure, all components of a model may be trained jointly as a single end-to-end (E2E) neural network. Here, an E2E model refers to a model whose architecture is constructed entirely of a neural network. A fully neural network functions without external and/or manually designed components (e.g., finite state transducers, a lexicon, or text normalization modules). Additionally, when training E2E models, these models generally do not require bootstrapping from decision trees or time alignments from a separate system.

Moreover, when using an ASR system today there is a demand that the ASR system decode utterances in a streaming fashion that corresponds to displaying a transcription of an utterance in real-time, or even faster than real-time, as a user speaks. To illustrate, when an ASR system is deployed on a mobile phone that experiences direct user interactivity, an application on the mobile phone using the ASR system may require the speech recognition to be streaming such that words, word pieces, and/or individual characters appear on the screen as soon as they are spoken. Here, it is also likely that the user of the mobile phone has a low tolerance for latency. Due to this low tolerance, the speech recognition strives to run on the mobile device in a manner that minimizes an impact from latency and inaccuracy that may detrimentally affect the user's experience. However, sequence-to-sequence models such as the LAS model that function by reviewing an entire input sequence of audio before generating output text, do not allow for streaming outputs as inputs are received. Due to this deficiency, deploying the LAS model for speech applications that are latency sensitive and/or require real-time voice transcription may pose issues. This makes an LAS model alone not an ideal model for mobile technology (e.g., mobile phones) that often relies on real-time applications (e.g., real-time communication applications).

Another form of a sequence-to-sequence model known as a recurrent neural network transducer (RNN-T) does not employ an attention mechanism and, unlike other sequence-to-sequence models that generally need to process an entire sequence (e.g., audio waveform) to produce an output (e.g., a sentence), the RNN-T continuously processes input samples and streams output symbols, a feature that is particularly attractive for real-time communication. For instance, speech recognition with an RNN-T may output characters one-by-one as spoken. Here, an RNN-T uses a feedback loop that feeds symbols predicted by the model back into itself to predict the next symbols. Because decoding the RNN-T includes a beam search through a single neural network instead of a large decoder graph, an RNN-T may scale to a fraction of the size of a server-based speech recognition model. With the size reduction, the RNN-T may be deployed entirely on-device and be able to run offline (i.e., without a network connection); therefore, avoiding unreliability issues with communication networks.

The RNN-T model alone, however, still lags behind a large state-of-the-art conventional model (e.g., a server-based model with separate AM, PM, and LMs) in terms of quality (e.g., speech recognition accuracy). Yet a non-streaming E2E, LAS model has speech recognition quality that is comparable to large state-of-the-art conventional models. To capitalize on the quality of a non-steaming E2E LAS model, a two-pass speech recognition system (e.g., shown in FIG. 2A) was developed that includes a first-pass component of an RNN-T network followed by a second-pass component of a LAS network. With this design, the two-pass model benefits from the streaming nature of an RNN-T model with low latency while improving the accuracy of the RNN-T model through the second-pass incorporating the LAS network. Although the LAS network increases the latency when compared to only a RNN-T model, the increase in latency is reasonably slight and complies with latency constraints for on-device operation. With respect to accuracy, a two-pass model achieves a 17-22% WER reduction when compared to a RNN-T alone and has a similar WER when compared to a large conventional model.

The accuracy of an ASR system can be affected by various factors such as the speakers' accent, background noise, recording channel, spoken contents, etc. Confidence scores can be used to measure the reliability of the ASR outputs and predict recognition errors. Confidence scores are an important feature of ASR systems that support many downstream applications to mitigate speech recognition errors. For example, unlabeled utterances with recognition results output from an ASR model that that achieve high confidence may be used for semi-supervised training of the ASR model which may reduce the expense of using only transcribed utterances for training. On the other hand, in applications such as spoken dialog systems in which a user interacts with a digital assistant executing on a computing device, utterances with recognition results that achieve low word-level confidence may prompt the user to correct any mis-transcribed words. Additionally, recognition results with low confidence may result in passing audio for the corresponding utterance to a different ASR model (e.g., server-side) for improving recognition on the utterance.

While conventional hybrid ASR systems can easily estimate word-level confidence scores from word posterior probabilities computed from lattices or confusion networks and then aggregated to provide an utterance-level confidence, the deep neural networks employed by E2E ASR models tend to exhibit overconfidence when predicting words. As many E2E ASR models are configured to output recognition results at the sub-word level, simply learning confidence scores for each sub-word recognized by the ASR model using a corresponding fixed sub-word tokenization for the word as a reference sequence can lead to incorrect ground truth labels used for training confidence estimation models since recognition results may contain multiple valid tokenizations. For instance, a reference fixed sub-word sequence for the utterance "Good morning" may be "go, od, morn, ing" while a hypothesized sub-word sequence recognized by the ASR model may be "go, od, mor, ning, mom". Here, even though the word "morning" is correctly recognized by the ASR model, the sub-word labels for the corresponding hypothesized sub-words "mor" and "ning" recognized by the ASR model would be labeled incorrect because they do not match the corresponding reference fixed sub-words "morn" and "ing" for the word "morning".

To alleviate the drawbacks associated with estimating sub-word confidence scores for hypothesized sub-word sequences recognized by ASR models due to mismatches between reference fixed sub-word sequences, ASR models may leverage confidence estimation models (CEM) that apply self-attention in order to estimate word-level confidence for each recognized word using only the confidence of the final hypothesized sub-word unit recognized by the ASR model that makes up the corresponding word. CEMs disclosed herein are additionally capable of leveraging cross-attention to attend to acoustic context for an utterance being recognized as well as linguistic context for multiple hypotheses (e.g., N-best list) recognized by the ASR model during a first pass. As will become apparent, the leveraging of both acoustic and linguistic cross-attention leads to increased accuracy in confidence scores estimated by the CEM.

Notably, conventional CEMs so not depend on decoder features from the decoder of the ASR model. In order to produce reliable confidence scores that are consistent with the outputs produced by the decoder, the CEM may be trained on the same training data used to train the E2E ASR model, but with additional augmentation. However, one drawback of training the CEM independent of decoder features is the inability to leverage contextual information that is often incorporated into the decoder to improve the ASR output quality. For example, techniques such as contextual biasing and language model fusion have been incorporated into ASR modeling via input of external contextual information to improve rare word recognition performance. Unfortunately, the CEM is not aware of the contextual information and therefore is not able to accurately predict the confidence scores for the words that have been corrected by the contextual information.

In order to further improve confidence accuracy of the CEM, implementations herein are directed toward a context-aware CEM that is able to take into account the contextual information when predicting the confidence scores. Specifically, implementations herein are directed toward leveraging both the CEM and a neural associative memory (NAM) contextual biasing model in order to tightly integrate the contextual biasing and confidence estimation into a single E2E ASR model. The NAM contextual biasing model may use a multi-head attention mechanism to incorporate the contextual information into the encoder of the E2E model. By leveraging the NAM contextual biasing model to provide the contextual information used for biasing as input to the encoder, the CEM is capable of being trained on top of the biased-encoder features output from the encoder and biased by the NAM contextual biasing model. As will become apparent, the resulting model learns to pay attention to the contextual information to improve the confidence scores output by the CEM for the context-corrected words.

FIG. 1 is an example speech environment 100 in which a user 10 interacts with a user device 110 through voice input. The user device 110 (also referred to generally as device 110) includes a computing device that is configured to capture sounds (e.g., streaming audio data) from one or more users 10 within the speech-enabled environment 100. Here, the streaming audio data 202 may refer to a spoken utterance by the user 10 that functions as an audible query, a command for the device 110, or an audible communication captured by the device 110. Speech-enabled systems of the device 110 may field the query or the command by answering the query and/or causing the command to be performed.

The user device 110 may correspond to any computing device capable of receiving audio data 202. Some examples of user devices 110 include, but are not limited to, mobile devices (e.g., mobile phones, tablets, laptops, etc.), computers, wearable devices (e.g., smart watches), smart appliances, internet of things (IoT) devices, smart speakers/displays, vehicle infotainment systems, etc. The user device 110 includes data processing hardware 112 and memory hardware 114 in communication with the data processing hardware 112 and storing instructions, that when executed by the data processing hardware 112, cause the data processing hardware 112 to perform one or more operations. The user device 110 further includes an audio subsystem 116 with an audio capture device (e.g., microphone) 116, 116a for capturing and converting spoken utterances 12 within the speech-enabled system 100 into electrical signals and a speech output device (e.g., a speaker) 116, 116b for communicating an audible audio signal (e.g., as output audio data from the device 110). While the user device 110 implements a single audio capture device 116a in the example shown, the user device 110 may implement an array of audio capture devices 116a without departing from the scope of the present disclosure, whereby one or more capture devices 116a in the array may not physically reside on the user device 110, but be in communication with the audio subsystem 116. In the example shown, the user device 110 (e.g., using the hardware 112, 114) implements a speech recognizer 200 that is configured to perform speech recognition on audio data 202 corresponding to an utterance 12 spoken by the user 10. Here, the audio capture device 116a is configured to capture acoustic sounds representing the utterance 12 and convert the acoustic sounds into the audio data 202 associated with a digital format compatible with the speech recognizer 200. The digital format associated with the audio data 202 may correspond to acoustic frames (e.g., parameterized acoustic frames), such as mel frames. For instance, the parameterized acoustic frames correspond to log-mel filterbank energies.

While FIG. 1 shows the user device 100 implementing the speech recognizer 200 for performing speech recognition on-device, other implementations include a remote server 410 (FIG. 4) implementing the speech recognizer 200 by processing the audio data 202 transmitted by the user device 110 via a network and providing a transcription 204 of the audio data 202 back to the user device 110. In some additional implementations, the user device 110 utilizes both a local speech recognizer 200 residing on the user device 110 and a server-side speech recognizer 402 (FIG. 4) that executes on the remote server 410. Here, user device 110 may use the local speech recognizer 200 when a network connection is not available or for speech applications that are latency sensitive and/or require streaming transcription, while the server-side speech recognizer 402 may be leveraged when additional resources are required to improve speech recognition accuracy as described in greater detail below with reference to FIG. 4.

In some examples, the user 10 interacts with a program or application 118 executing on the user device 110 that uses the speech recognizer 200. For instance, FIG. 1 depicts the user 10 communicating with an automated assistant application 118. In this example, the user (e.g., Bill) 10 directs a query toward the automated assistant application 118 by speaking an utterance 12, "Call Maikel", that is captured by the audio capture device 116a and converted into corresponding audio data 202 (e.g. as acoustic frames) for processing by the speech recognizer 200. In this example, the speech recognizer 200 transcribes the audio data 202 representing the utterance 12 into a transcription 204 (e.g., a text representation of "Call Maikel"). Here, the automated assistant application 118 may apply natural language processing on the transcription 204 to generate a response 119 for output to the user 10 that conveys the message, "Calling Maikel on his cell phone now." Natural language processing generally refers to a process of interpreting written language (e.g., the transcription 204) and determining whether the written language prompts any action. In this example, the assistant application 118 uses natural language processing to recognize that the utterance 12 spoken by the user 10 is intended to invoke the assistant application 118 to access the contacts list of the user 10 and initiate a phone call to the contact named "Maikel", whereby the application 118 provides the response 119 indicating that the phone call to Maikel's cell phone has been initiated. That is, by recognizing these details with natural language processing, the assistant application 118 returns the response 119 to the user 12 as a synthesized speech representation for audible output through the audio output device 116a and/or as text for display on a screen in communication with the user device 110. In some examples, the user device 110 displays transcriptions 204 of utterances 12 spoken by the user 10 and corresponding responses 119 from the assistant application 118 as a conversation on the screen. In some configurations, natural language processing may occur on a remote system in communication with the data processing hardware 112 of the user device 110.

Figure 2:
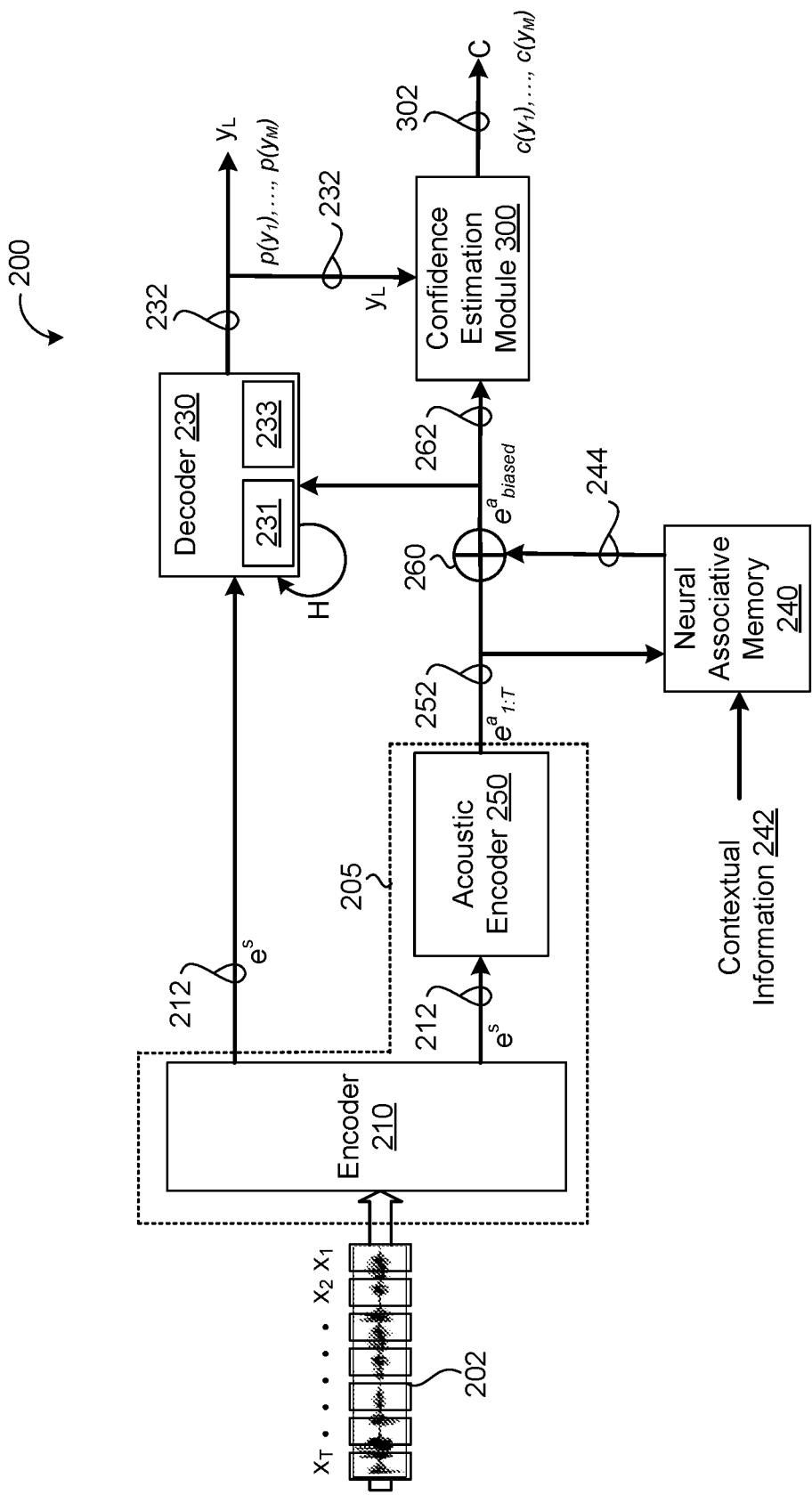
FIG. 2 is a schematic view of an example speech recognizer leveraging a context-aware confidence estimation model and a neural associative memory (NAM) biasing model.

In some examples, the speech recognizer 200 processes incoming audio data 202 in real-time to provide a streaming transcriptions 204. Here, the speech recognizer 200 is configured to produce a sequence of hypothesized sub-word units that make up the words of the utterance 12 spoken by the user 10. The hypothesized sub-word units may include word pieces or individual characters (e.g., graphemes). In the example shown, the sequence of hypothesized sub-word units recognized by the speech recognizer include "SOS_call_mai kel" in which the 'SOS' indicates a start of speech tag and each word boundary indicator ('_') indicates a beginning/starting sub-word unit for each word. Referring to FIG. 2, in some implementations, a speech recognizer 200 is configured in a two-pass decoding architecture and implements both a neural associative memory (NAM) biasing model 240 and a confidence estimation module (CEM) 300. The NAM biasing model 240 is configured to receive biasing context information 242 to encourage the speech recognizer 200 to recognize biasing phrases indicated by the biasing context information 242. The CEM 300 is configured to estimate a confidence 302 of a final speech recognition result 232 predicted by the speech recognizer 200. Notably, the speech recognizer 200 may utilize a two-pass architecture wherein the final speech recognition result 232 corresponds to a sequence of sub-word units, such as word pieces or graphemes, that when aggregated together form a transcription 204 for an utterance. Generally speaking, the two-pass architecture of the speech recognizer 200 includes an encoder 205 and a decoder 230. More specifically, the encoder 205 includes a cascading encoder 205 having a model structure where the encoding pathway includes two encoders 210, 250 that cascade such that the output of one encoder 210 feeds the input of the other decoder 230 prior to decoding. Here, the encoders 210, 250 can be cascaded irrespective of the underlying architecture for each encoder. The first, or shared, encoder 210 may correspond to a causal encoder 210 while the second, or acoustic, encoder 250 may correspond to a non-causal encoder 250 in cascade with the causal encoder 210. The shared encoder 210 may include a plurality of unidirectional long short-term memory (LSTM) layers or a plurality of multi-head attention layers such as conformer layers or transformer layers. Likewise, the acoustic encoder 250 may overlain on top of the causal encoder 210 and include a plurality of unidirectional LSTM layers or a plurality of multi-head attention layers such as conformer layers or transformer layers.

In some implementations, the encoders 210, 250 include a stack of 512-dimension conformer layers. Causal convolution and left-context attention layers may be used for each conformer layer to strictly restrict the model to use no future inputs. A multi-headed (e.g., 8 heads) attention mechanism may be used in a self-attention layer. The cascaded encoders, 210, 260 may include 17 conformer layers. Here, the first encoder 210 may include 15 conformer layers while the second encoder 250 may include two conformer layers that take in additional right context (e.g., 5.04 seconds). Optionally, other types of layers incorporating self-attention mechanisms, such as transformer layers, may be used in lieu of conformer layers.

In other implementations, one encoder is constructed with an LSTM structure while the other encoder is constructed using bi-directional LSTM layers or conformer layers (e.g., a conformer-transducer). In other words, the encoders 210, 250 may have different architectures or similar architectures. For instance, the cascading encoder 205 may be roughly analogous to an acoustic model (AM) in a traditional ASR system, and may include a recurrent network of stacked Long Short-Term Memory (LSTM) layers. Here, the first encoder 210 is a streaming encoder that includes unidirectional Long Short Term Memory (LSTM) layers while the second encoder 250 is a non-streaming encoder that includes bidirectional LSTM layers or conformer layers. In a cascading encoder 205, where both encoders 210, 250 include LSTM layers, the second encoder 250 that receives the output of the first encoder 210 may take advantage of the LSTM layers of the first encoder 210 such that the second encoder 250 includes fewer LSTM layers than the first encoder 210 (and fewer LSTM layers than a fully non-streaming model). By having fewer LSTM layers, the cascading encoder 205 may reduce the number of more computationally expensive bidirectional layers making the model 200 more streamlined than simply combining a traditional streaming model with a traditional non-streaming model.

The at least one shared encoder 210 is configured to receive, as input, the audio data 202 corresponding to the utterance 12 as a sequence of acoustic frames. The acoustic frames may be previously processed by the audio subsystem 116 into parameterized acoustic frames (e.g., mel frames and/or spectral frames). In some implementations, the parameterized acoustic frames correspond to log-mel filter-bank energies with log-mel features. For instance, the parameterized input acoustic frames representing the audio data 202 input into the encoder 210 may be represented as $x=(x_1, \ldots, x_T)$, where $x_t \in \mathbb{R}^d$ are log-mel filterbank energies, T denotes the number of frames in x, and d represents the number of log-Mel features. In some examples, each parameterized acoustic frame includes 128-dimensional log-mel features computed within a short shifting window (e.g., 32 milliseconds and shifted every 10 milliseconds). Each feature may be stacked with previous frames (e.g., three previous frames) to form a higher-dimensional vector (e.g., a 512-dimensional vector using the three previous frames). The features forming the vector may then be downsampled (e.g., to a 30 millisecond frame rate).

For each acoustic frame $x_{1:T}$ of the audio data 202 input to the encoder 210, the encoder 210 is configured to generate, as output 212, a first higher-order feature representation. The first-higher order feature representation 212 output at each corresponding time step may be denoted as $e^s$. Similarly, the second encoder 250 is connected in cascade to the first encoder 210, and is trained to receive the first higher-order feature representation 212 $e^s$ as input, and produce, as output 252, a second higher-order feature representation. This second higher-order feature representation is denoted as $e^a$. Each of the number of frames in x denoted by T corresponds to a respective time step. Notably, the second encoder 250 is configured to adapt to the first higher-order feature representation $e^s$ generated as output 212 from the shared encoder 210 for each acoustic frame x to be suitable for predicting the final speech recognition result 232 as well as confidence 302 estimation by the CEM 300. While examples herein depict both the first encoder 210 and the second encoder 250 being directly connected to, and shared by the same decoder 230, other configurations of the speech recognizer 200 may include the first encoder 210 connected to the decoder 230 while the second encoder 250 is connected to a different decoder. Accordingly, in the example shown, the decoder 230 receives both the first higher-order feature representation $e^s$ and the second higher order feature representation $e^a$ as inputs.

The decoder 230 may include a recurrent neural network-transducer (RNN-T) architecture having a joint layer 231 and a prediction network 233. The decoder 230 uses the joint layer 231 to combine (i.e., when the model 200 operates in non-streaming mode) the first and second higher order feature representations $e^s$, $e^a$, output by the cascading encoder 205, as well as an embedding output from the prediction network 233 for the previous prediction $y_{r-1}$), in order to produce a decoder output. When the model 200 operates in the streaming mode, the joint layer 231 receives the output of the prediction network 233 and only the first higher-order feature representation $e^s$ output from the first encoder 210. The decoder 230 output can be a probability distribution, $P(y_i|y_{i-1}, \ldots, y_0, x)$, over the current sub-word unit, $y_i$, given the sequence of the N previous non-blank symbols previous units, $\{y_{i-1}, \ldots, y_{i-N}\}$, and input, x. Although not illustrated, the model 200 may include a Softmax layer that receives output of the decoder 230. In some implementations, the Softmax layer is separate from the decoder 230 and processes the output, $y_r$, from the decoder 230. The output of the Softmax layer is then used in a beam search process to select orthographic elements. In some implementations, the Softmax layer is integrated with the decoder 230, such that the output 232 $y_r$ of the decoder 204 at each time step represents the output of the Softmax layer.

The decoder 230 is configured to generate, at each time step, a probability distribution over possible speech recognition hypotheses. Stated differently, the joint network 231 generates, at each output step (e.g., time step), a probability distribution over possible speech recognition hypotheses. Here, the "possible speech recognition hypotheses" correspond to a set of output labels/symbols (also referred to as "speech units") each representing a grapheme (e.g., symbol/character) or a word piece in a specified natural language. For example, when the natural language is English, the set of output labels may include twenty-seven (27) symbols, e.g., one label for each of the 26-letters in the English alphabet and one label designating a space. Accordingly, the joint network 231 may output a set of values indicative of the likelihood of occurrence of each of a predetermined set of output labels. This set of values can be a vector (e.g., a one-hot vector) and can indicate a probability distribution over the set of output labels. In some cases, the output labels are graphemes (e.g., individual characters, and potentially punctuation and other symbols), but the set of output labels is not so limited. For example, the set of output labels can include wordpieces and/or entire words, in addition to or instead of graphemes. The output labels could also be other types of speech units, such as phonemes or sub-phonemes. The output distribution of the joint network 231 can include a posterior probability value for each of the different output labels. Thus, if there are 100 different output labels representing different graphemes or other symbols, the output of the joint network 231 can include 100 different probability values, one for each output label. The probability distribution can then be used to select and assign scores to candidate orthographic elements (e.g., graphemes, wordpieces, and/or words) in a beam search process (e.g., by the Softmax layer) for determining the transcription 204.

Within the decoder 230, the prediction network 233 may have two 2,048-dimensional LSTM layers, each of which is also followed by 640-dimensional projection layer, such that the LSTM-based prediction network may have about 23.4 million parameters. In other configurations, the prediction network 233 may instead include conformer or transformer layers in lieu of LSTM layers. In yet other configurations, the prediction network 233 includes a V2 embedding look up table that includes an embedding prediction network. At each time step, the V2 embedding lookup table may receive, as input, the previous two predictions (e.g., 1-hot vectors) output by the joint network 231, compute a respective embedding $d_1$, $d_2$ for each of the previous two predictions, and provide a concatenated output [$d_1$, $d_2$] to the joint layer 231. Comparatively, the V2 embedding lookup table may have only about two (2) million parameters, whereas an LSTM-based prediction network may include about 23.4 million parameters. Finally, the joint network 231 may also be a one-layer neural network with 640 hidden units. The Softmax layer may be composed of a unified word piece or grapheme set that is generated using all unique word pieces or graphemes in a plurality of training data sets. In some implementations, in order to limit the amount of future context that the cascaded encoders model 200 sees, the second encoder 250 uses some number of multi-head attention layers (e.g., two conformer layers) with a particular amount of right context (e.g., five seconds of right context).

During a streaming speech recognition mode, the decoder 230 receives, as input, the first higher-order feature representation $e^s$ generated as output 212 from the first encoder 210 for each acoustic frame x and generates, as output in a streaming fashion, one or more candidate hypotheses H each represented by a respective sequence of hypothesized sub-word units $y_1, y_2, y_3, \ldots, y_M$. For instance, in the example where the user 10 utters "Good morning", one candidate hypothesis H may include a first sequence of hypothesized sub-word units [_go, od, mor, ning] and another candidate hypothesis H may include a second sequence of hypothesized sub-word units [_go, od, _morn, ing]. There are may be a multitude of other candidate hypothesis H as well. Here, the respective sequence of hypothesized sub-word units $y_1$, $y_2, y_3, \ldots, y_M$ representing each candidate hypothesis H corresponds to a candidate transcription for the utterance 12. Each sub-word unity, in each respective sequence of hypothesized sub-word units $y_1, y_2, y_3, \ldots, y_M$ denotes a probability distribution over possible sub-units. The sub-word unit with a highest probability in the probability distribution may be selected as the hypothesized sub-word in the respective sequence of hypothesized sub-word units In some implementations, the speech recognizer 200 operates in a non-streaming mode. The non-streaming mode may occur, for instance, in non-latency intensive applications such as when the user 10 is viewing a transcription of a voicemail left on his/her phone. As discussed above, this type of application benefits from using future context to improve performance (i.e., improve speech recognition accuracy) in exchange for increased processing times. Here, the speech recognizer 200 first uses the first encoder 210 to generate the first higher order representation $e^s$ at each time step for input to the second encoder 250, but the decoder 230 does not decode any of the first higher order representations $e^s$. Thus, by leveraging the sequence of second higher-order feature representations $e^a$, the decoder 230 may generate a more accurate final speech recognition result 232 at the cost of reduced latency.

As described above, the NAM biasing model 240 receives biasing context information 242 to encourage the speech recognizer 200 to recognize biasing phrases indicated by the biasing context information 242. Here, the biasing context information 242 may include biasing phrases such as rare words or out-of-vocabulary (OOV) terms not present, or scarce, in training data used to train the speech recognizer 200. The NAM biasing model 240 aims to adaptively (on-the-fly) edit the recognition results based on the contextual information 242 received as text in order to improve recognition of rare words and OOV terms. The contextual biasing information 242, and biasing phrases included therein, may include names/addresses in the user's contact list, city/street names proximate to a geographical area, and rare words/OOV terms previously used by the user to name a few non-limiting examples. Notably, the NAM biasing model 240 is able to incorporate the biasing context information 242 into the speech recognizer 200 by storing a chain of token transitions 244 in a key-value memory and applying an attention mechanism 260 to traverse through the transition chain 244 and modify/bias the second higher-order feature representations $e^a$ produced by the second encoder 250. More specifically, the NAM biasing model 240 includes a context encoder configured to produce bi-directional contextual embeddings of each biasing phrase indicated by the biasing context information 242. Each biasing phrase may be represented by respective wordpiece identifiers that identify wordpieces forming each biasing phrase such that the context encoder computes a corresponding contextual embedding for each biasing phrase. Thereafter, neural associative memory updates to learn conditional transitions for new biasing phrases by storing the associative transition between wordpiece sub-sequences of a same biasing phrase. In the associative memory, every wordpiece token in each phrase is used as a key to map to a next wordpiece token (left-shifted), such that a memory item 1 of a key-value pair ($k_1, v_1$) is built from two successive context embeddings. As a result, the associative memory creates the transition chain 244 to allow for easy recovery of a current token from the memory by using its previous element to traverse a biasing phrase in a fine-grained manner. The attention mechanism includes a multi-head attention mechanism that uses multiple heads in a single pass to enable computation of relevant biasing context by using the second higher-order feature representation $e^a$ rather than partially decoded text for contextual audio representations, thereby enabling the attention mechanism 260 to learn across multi-modalities.

The entire speech recognizer 200, including the cascading encoder 205 and the decoder 230, may be trained jointly with the NAM biasing model 240 to ensure that the second higher-order feature representations $e^a$ are modified/biased by the biasing context information 242 in order to encourage the decoder 230 to recognize the biasing phrases indicated by the biasing context information 242 when present. By contrast, external biasing modules that are typically added on top of speech recognizers, such as external language models leveraging traditional finite state transducers (FSTs), while effective for biasing output speech recognition results toward biasing phrases, are not straightforward to integrate with the CEM 300 since FSTs perform post-prediction edits. For example, an external biasing module may leverage contextual biasing information to detect a rare word such as Maikel in a speech input "My name is Maikel" that the speech recognizer failed to recognize, but the CEM 300 would still assign a low confidence score because the CEM 300 would be unaware of the contextual biasing information. As a result, external biasing modules are not suitable candidates for integration with CEM 300 because the CEM 300 is prone to underestimate the confidence of speech recognition results containing rare words/OOV terms corrected by the contextual biasing information.

Based on the second higher-order feature representations $e^a$ produced by the second encoder 250 and the transition chain 244 associated with the biasing context information 242 output from the NAM biasing model 240, the attention mechanism 260 produces, via a projection layer (not shown), a biasing context vector $e^a_{biased}$ 262. The biasing context vector $e^a_{biased}$ 262 is provided as input to the decoder 230 and the CEM 300. Here, the decoder 230 may decode the biasing context vector $e^a_{biased}$ 262 to predict the final speech recognition result 232 that includes any biasing phrases indicated by the biasing contextual information 242 when present in the input audio data 202 corresponding to the utterance 12 spoken by the user 10. At the same time, the CEM 300 may use the biasing context vector $e^a_{biased}$ 262 when estimating the confidence 302 of the final speech recognition results 232 predicted by the decoder 230 of the speech recognizer 200.

To decrease a size of the softmax layer performing beam search on the output of the decoder, the sub-word unit vocabulary of possible sub-word units is typically smaller compared to a word vocabulary. The sub-word unit vocabulary may include graphemes or wordpieces (WP). An example WP vocabulary may include 4,096 WPs. While examples of the present disclosure use WPs as the sub-word units generated as output from the speech recognizer, graphemes can be similarly utilized as the sub-word units output from the speech recognizer without departing from the scope of the present disclosure. Accordingly, to compute a word error rate (WER) for a candidate hypothesis H, the respective sequence of hypothesized sub-word units (e.g., WPs) needs to be converted into its corresponding word sequence $w_1, w_2, \ldots, w_L$. This procedure for converting a sub-word sequence into a word sequence is uniquely determined since the first sub-word unit (e.g., WP) of each word begins with the word boundary indicator ('_'). Similarly, for a word $w_j$ including $Q_j$ WPs, where $y_{j,q}$ denotes the q-th WP of the j-th word, a simple technique for computing word confidence can be expressed by as follows.

$$c_{word}(w_j) = agg(c(y_{j,1}), \ldots, c(y_{j,Q_j})) \quad (1)$$

wherein agg can be arithmetic mean, minimum, product, or a neural network. However, since each word $w_j$ can be divided into multiple different valid WP combinations due to a mismatch between WP correctness and word correctness, using Equation 1 to estimate word-level confidence creates an undesirable computational burden during training since a search over all possible reference tokenizations for the one having a fewest WP edits is required. As used herein, a WP edit includes a correct (cor) label when a hypothesized WP matches a reference WP, a substitution (sub) label when a valid hypothesized WP does not match a reference WP, and an insertion (ins) when a hypothesized WP is misrecognized. Table 1 below shows an example where the word "morning" is correctly transcribed, but results in two substitutions in the WP edit distance output.

TABLE 1

| Hyp: | _go | od | _mor | ning | _mom |
|---|---|---|---|---|---|
| Ref: | _go | od | _morn | ing | |
| WP edit: | cor | cor | sub | sub | ins |
| Word edit: | — | cor | — | cor | ins |
| $d(w_j)$: | — | 1 | — | 1 | 0 |
| $m(y_i)$: | 0 | 1 | 0 | 1 | 1 |
| $L(y_i)$: | 0 | $\log c(y_2)$ | 0 | $\log c(y_4)$ | $\log(1 - c(y_5))$ |

Figure 3:
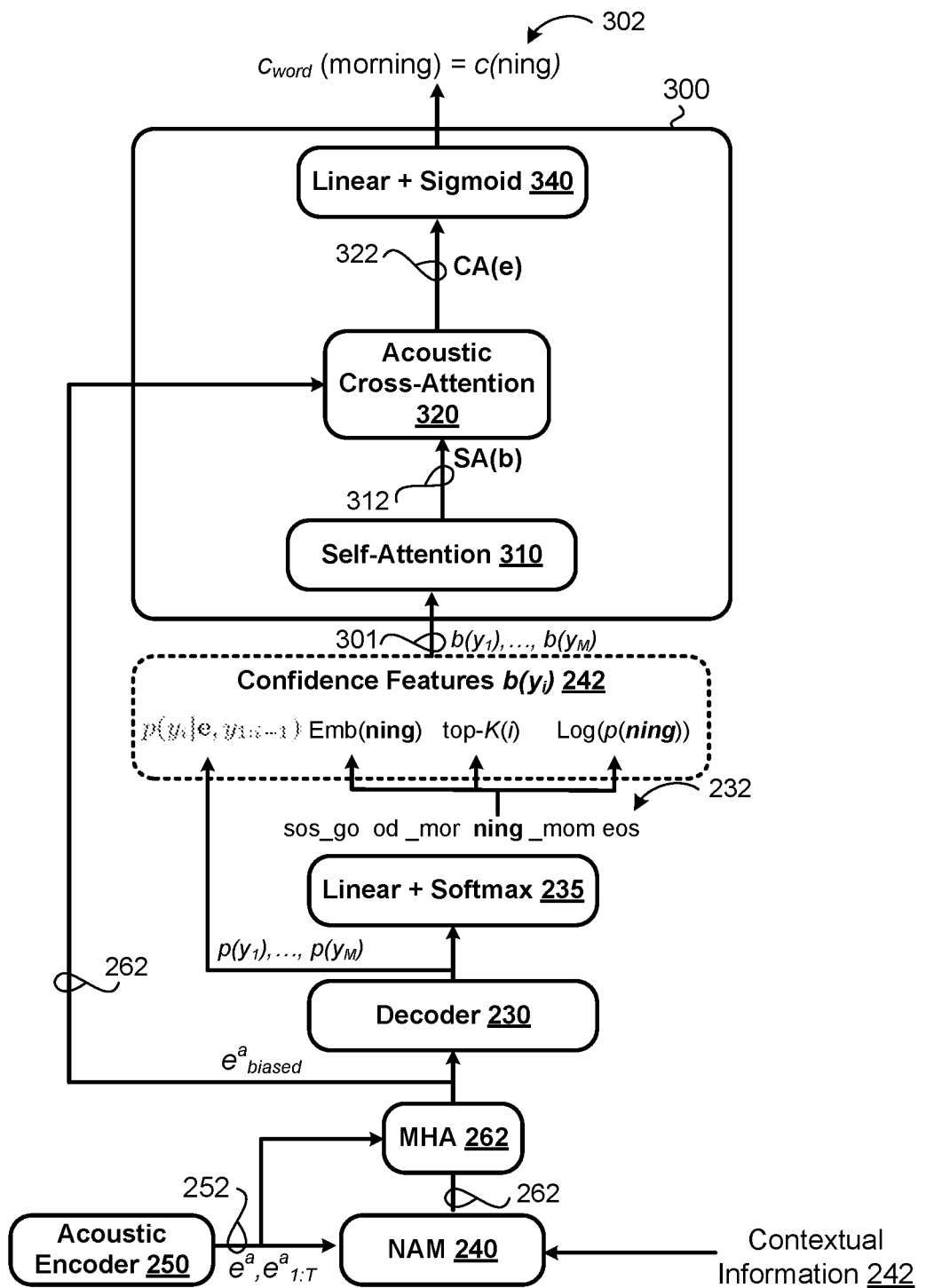
FIG. 3 is a schematic view of an example the context-aware estimation model overlain on the speech recognizer and the NAM biasing model.

To cure the inherent mismatch between WP correctness and word correctness resulting from speech recognizers 200 that output at the WP level as depicted in Table 1, implementations herein leverage the CEM 300 to provide confidence output at the final WP of every word as a word-level confidence while ignoring the confidence of all other preceding WPs of every word. FIG. 3 shows an example of the CEM 300 using the biasing context vectors $e^a_{biased}$ 262 output from the NAM biasing model 240 to incorporate knowledge of any biasing phrases that may be present in final speech recognition results 232 output from the decoder 230 that the CEM 300 is performing word-level confidence estimations on. For clarity, FIG. 3 depicts only the actions of the CEM 300 predicting a confidence output $c(y_i)$ 302 for the i-th WP in a respective sequence of hypothesized WPs $y_1, y_2, y_3, \ldots, y_M$ representing the final recognition result 232 output from the decoder 230 while operating in the non-streaming mode. Specifically, FIG. 3 depicts the CEM 300 predicting the confidence output c("ning") for the "ning" WP in the respective sequence of hypothesized WPs [_go, od, _mor, ning] that converts into the corresponding word sequence "good morning".

The second encoder 250 generates the sequence second higher-order feature representations $e^a_{1:T}$ 252 where T corresponds to a number of acoustic frames x segmented from the utterance 12. At the same time, the NAM biasing model 240 receives the contextual biasing information 242 containing biasing phrases, wherein each biasing phrase may be represented by respective wordpiece identifiers that identify wordpieces forming the biasing phrase such NAM biasing model 240 computes a corresponding contextual embedding for each biasing phrase. Thereafter, neural associative memory updates to learn conditional transitions for new biasing phrases by storing the associative transition between wordpiece sub-sequences of a same biasing phrase. In the associative memory, every wordpiece token in each phrase is used as a key to map to a next wordpiece token (left-shifted), such that a memory item 1 of a key-value pair $(k_1, v_1)$ is built from two successive context embeddings. As a result, the associative memory creates the transition chain 244 to allow for easy recovery of a current token from the memory by using its previous element to traverse a biasing phrase in a fine-grained manner.

The multi-head attention (MHA) mechanism 260 receives the transition chain 244 and the sequence of second higher-order feature representations $e^a_{1:T}$ 252 to generate the biasing context vectors $e^a_{biased}$ 262. The biasing context vectors $e^a_{biased}$ 262 are provided as input to both the decoder 230 and an acoustic cross-attention mechanism 320 of the CEM 300. Based on the biasing context vectors $e^a_{biased}$ 262 incorporating the contextual biasing information 242, the decoder 230 is configured to determine, at each of a plurality of times steps, a probability distribution over possible sub-word units to provide a sequence of hypothesized sub-word units $p(y_1), p(y_2), p(y_3), \ldots, p(y_M)$, whereby a linear+softmax 235 may output the candidate hypothesis H associated with a highest second pass log probability $$\sum_{i=1}^{M} \log(p(y_i \mid e, y_{1:i-1}))$$

as the final recognition result 232. Here, the final recognition result 232 includes the sequence of hypothesized sub-word (e.g., WP) units [sos_go, od, _mor, ning eos] with start of speech (sos) and end of speech (eos) tags For each sub-word unit ($y_i$) in the sequence of hypothesized sub-word (e.g., WP) units [sos_go, od, _mor, ning eos] representing the final recognition result 232, a confidence embedding b($y_i$) 301 representing a set of confidence features obtained from the speech recognizer 200 is provided as input to the CEM 300 for determining a respective confidence output c($y_i$) 302. In the example shown, the i-th sub-word unit corresponds to the WP "ning". Here, the confidence embedding b($y_i$) 301 conveys one or more of a softmax posteriors feature $\phi$(i|e, $y_{1:i-1}$) of the decoder 230, an input subword embedding Emb($y_i$) feature (e.g., Emb (ning)), a log posterior log (p($y_i$)) feature, and a top-K(i) feature. The softmax posteriors feature indicates internal features for the WP "ning", internal features for the biasing context vector $e^a_{biased,1:T}$ 262 and the penultimate layer activations $\phi$ for the decoder 230. The log posterior log (p($y_1$)) feature indicates a probability value associated with the probability/likelihood that sub-word unity, includes the WP "ning", and the top-K(i) feature indicates the K largest log probabilities at decoder index (e.g., time step) i. Stated differently, the top-K(i) feature provides probability values for each candidate hypothesis H in the top-K at decoder index (e.g., time step) i. Since both the speech recognizer 200 and the CEM 300 are configured to generate an output for each time step at the sub-word (e.g., WP) level, implementing the CEM 300 as a transformer permits: (1) the use of word edit distance output as ground truth training labels by leveraging the confidence output c($y_j$, $Q_j$) at the final WP of every word $c_{word}(w_j)$ as a dedicated word-level confidence 302; and (2) the incorporation of information/features from every WP that makes up the word. In the example shown, a self-attention mechanism 310 of the transformer-based CEM 300 applies self-attention to a confidence feature vector b based on the confidence embedding b($y_i$) 301 for the i-th sub-word unit corresponding to the WP "ning" as well as confidence embeddings for earlier sub-word units in the same word. The confidence feature vector b may be expressed by the following equations.

$$b(y_i)=[\text{Emb}(y_i);\phi(i|e,y_{1:i-1});\log(p(y_i));\text{top-}K(i)] \quad (2)$$

$$b=\{b(y_1), \ldots, b(y_i)\} \quad (3)$$

Additionally, an acoustic cross-attention mechanism 320 of the transformer-based CEM 300 applies acoustic cross-attention (CA(e)) to the sequence of biasing context vectors $e^a_{biased,1:T}$ 262 to generate an acoustic context vector 322 for improving the accuracy in estimating the respective confidence output c($y_i$) 302 for the i-th sub-word unit corresponding the WP "ning". Finally, a linear+sigmoid block 340 uses the self-attention confidence feature vector SA(b) and the cross-attention CA(e) acoustic context vector 322 to permit the transformer-based CEM 300 to produce the dedicated confidence 302 for each word $c_{word}(w_j)$ using a confidence output c($y_j$, $Q_j$) at the final WP as follows.

$$c(y_i)=\sigma(\text{Transformer}(CA(e),SA(b))) \quad (4)$$

$$c_{word}(w_j)=c(y_j,Q_j), \quad (5)$$

where the confidence 302 for the word $c_{word}$(morning) in the example shown corresponds to the confidence output c(ning) of the final WP that makes up the word.

Implementations are directed toward training the speech recognizer 200 (i.e., the cascading encoder 205 and the decoder 230) and the NAM biasing model 240 jointly. Here, the training data used to jointly train the speech recognizer 200 and the NAM biasing model 240 may include multi-domain training utterances that each include audio data characterizing the training utterances paired with a corresponding transcription of the training utterance. In some examples, the CEM 300 is trained separately from the jointly trained speech recognizer 200 and the NAM biasing model 240. In these examples, while the separately trained CEM is not aware of training examples, and more particularly second higher-order feature representations 252, biased/modified by the NAM biasing model 240, provides improved confidence accuracy on results that have been corrected by the contextual information 242. Notably, the separately trained CEM may be trained on top of the same speech recognizer 200.

In other examples, the NAM biasing model 240 is jointly trained with a pre-trained speech recognizer 200, and subsequently, the CEM 300 is trained on top of the jointly trained speech recognizer 200 and NAM biasing model 240. In these other examples, the CEM 300 is trained on top of the jointly trained speech recognizer 200 and NAM biasing model 240 using a binary cross-entropy word-level loss as follows.

$$\mathcal{L} = -\sum_{j=1}^{L} d(w_j)\log c_{word}(w_j) + (1 - d(w_j))\log(1 - c_{word}(w_j)). \quad (6)$$

where Table 1 shows that d($w_j$) is equal to one when a Levenshtein word-level edit distance for the word $w_j$ outputs the "correct" (cor) label when the hypothesized word matches the reference word, and d($w_j$) is equal to zero when the Levenshtein word-level edit distance for the word $w_j$ outputs the "insertion" (ins) or "substitution" (sub) labels when the hypothesized word does not match the reference word. Notably, since the speech recognizer 200 and the CEM 300 output at the sub-word level (e.g., output every WP), Table 1 also shows the CEM 300 applying an end-of word mask loss m to focus only on the final WP making up the word and ignore WP losses associated with earlier WPs that make up the same word.

Figure 4:
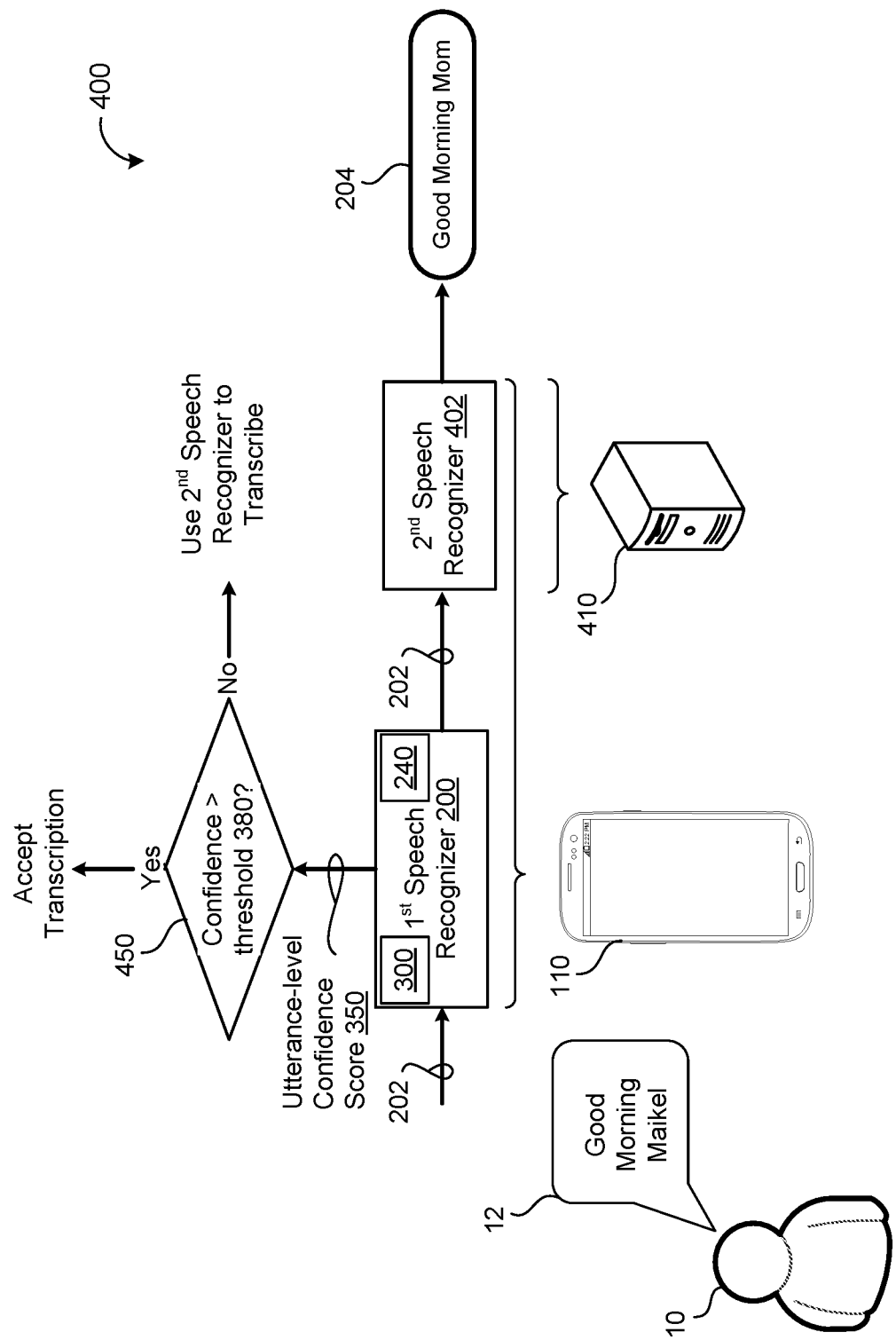
FIG. 4 is a schematic view of an example confidence-based routine for selecting an appropriate speech recognizer based on utterance-level confidence.

FIG. 4 shows a schematic view 400 of an example confidence-based routine for selecting an appropriate speech recognizer to transcribe an utterance 12. In the example shown, a first speech recognizer 200 operates as a default speech recognizer for generating a transcription 204 by processing incoming audio data 202 corresponding to an utterance 12 spoken by a user 10. The first speech recognizer 200 may correspond to a local speech recognizer that executes on a user device 110 associated with the user 10. The first speech recognizer 200 also implements the NAM biasing model 240 and the CEM 300 to incorporate external context information 242 when determining an utterance-level confidence score 350 for a speech recognition result 232 output by the first speech recognizer 200 that corresponds to the transcription 204.

In some implementations, the confidence-based routine determines whether the utterance-level confidence score 350 for the utterance 12 transcribed by the first speech recognizer 200 satisfies a confidence threshold. In the example shown, utterance-level confidence scores 350 greater than the confidence threshold satisfy the confidence threshold while utterance-level confidence scores 350 less than or equal to the confidence threshold fail to satisfy the confidence threshold. When the utterance-level confidence score 350 satisfies (e.g., is greater than) the confidence threshold (e.g., decision block 450 is "Yes"), then the transcription 204 generated by the first speech recognizer 200 is accepted to achieve on-device gains in quality, latency, and reliability. Here, the accepted transcription 204 may display, or continue to display, on the user device 110 and/or be passed to a downstream natural language understanding (NLU) module for interpreting the transcription 204 and performing a related action/operation if necessary.

When the utterance-level confidence score 350 fails to satisfy (e.g., is less than) the confidence threshold (e.g., decision block 450 is "No"), then the confidence-based routine rejects the transcription 204 generated by the first speech recognizer 200 and passes the audio data 202 to the second speech recognizer 402 for processing to re-transcribe the utterance 12. The transcription 204 generated by the second speech recognizer 402 may be passed back to the user device 110 and/or to the downstream NLU module for interpretation. In examples where the first speech recognizer 200 is local and executing on-device 110 and the second speech recognizer 402 is server-side and executing on a remote server 410, the confidence-based routine causes the user device 110 to transmit the audio data 202 to the remote server 410 via a network (not shown) so that the second speech recognizer 402 executing thereon can transcribe the utterance 12. The second speech recognizer 402 may leverage a large language model trained on large-scale language model training data making the second speech recognizer 402 more suitable for recognizing proper nouns or less-common words not present in the training data used to train the first speech recognizer 200.

In some examples, the first speech recognizer 200 is generally more accurate (e.g., achieves lower word error rates) for recognizing short-form utterances than the second speech recognizer 402 implementing the larger language model and lexicon, the first speech recognizer 200 may ultimately be less accurate at recognizing long-tail utterances than the second speech recognizer 402. As thus, the confidence-based routine may send all utterances with confidence scores 350 less than the confidence threshold to the second speech recognizer 402 for generating the transcription 204, and transcribe a majority of utterances on-device 110 using the first speech recognizer 200 to gain quality, latency, and reliability.

While the second speech recognizer 402 is shown as being server-side, the second speech recognizer 402 could also execute on-device. For instance, the second speech recognizer 402 may be associated with a more computationally-intensive speech recognizer that may generate more accurate speech recognition results on certain utterances than the first speech recognizer 200, but at the cost of reduced latency and increased power consumption. As such, the confidence-based routine may leverage the second speech recognizer 402 to transcribe utterances 12 when utterance-level confidence scores associated with recognition results generated by the first speech recognizer 200 are less than the confidence threshold.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 5:
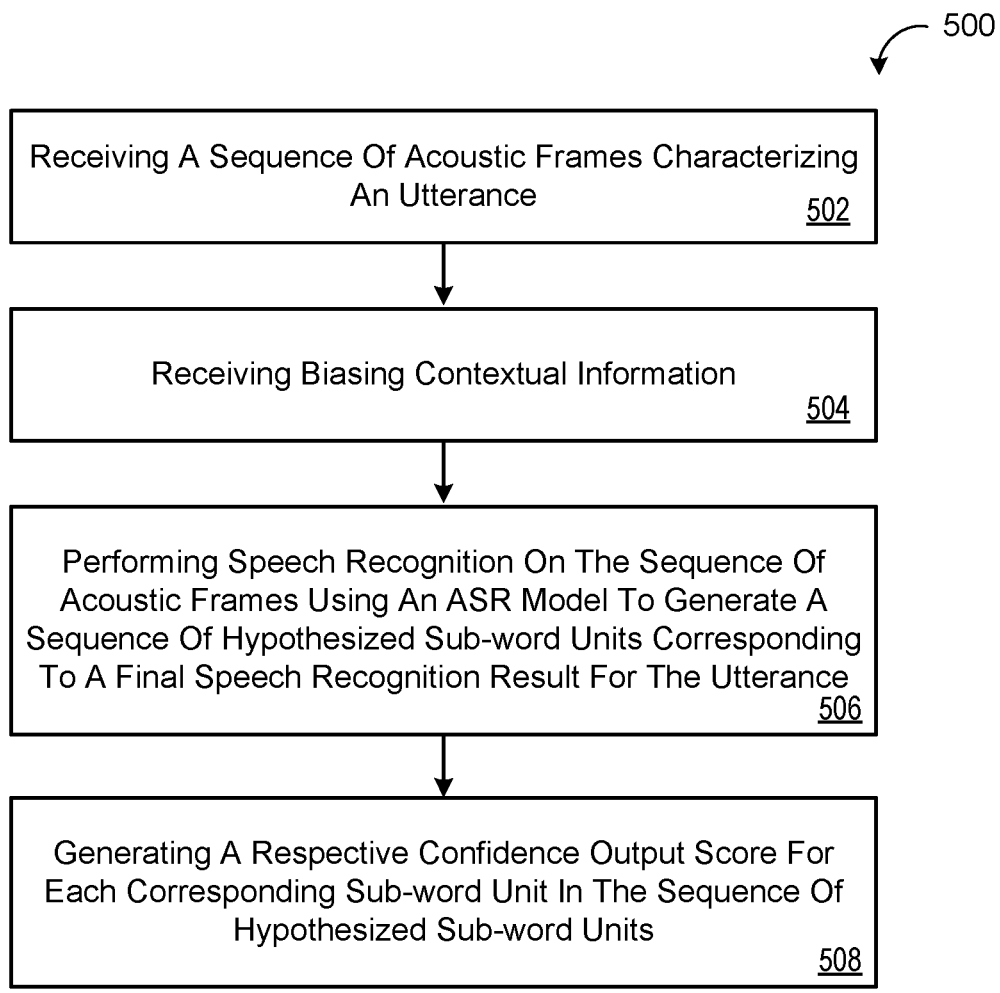
FIG. 5 is a flowchart of an example arrangement of operations for a method of generating confidence output scores for corresponding sub-word units in a sequence of hypothesized sub-word units.

FIG. 5 is a flowchart of an example arrangement of operations for a method 500 of estimating word-level confidence for a word recognized by a speech recognizer biased by a neural associative memory (NAM) biasing model 240. The data processing hardware 112 (FIG. 1) may execute instructions stored on the memory hardware 114 (FIG. 1) to perform example arrangement of operations for the method 500. At operation 502, the method 500 includes receiving a sequence of acoustic frames 202 characterizing an utterance 12 spoken by a user 10. At operation 504, the method 500 includes receiving biasing contextual information 242.

At operation 506, the method 500 includes performing, using an automatic speech recognition (ASR) model 200, speech recognition on the sequence of acoustic frames 202 by: generating, by an audio encoder 205 of the ASR model 200, a sequence of higher-order feature representations 252 each associated with a corresponding acoustic frame in the sequence of acoustic frames 202; modifying, by the NAM biasing model 240, using the biasing contextual information 242, the sequence of higher-order feature representations 252 to generate a corresponding sequence of biasing context vectors 262; and based on the biasing context vectors 262, generating, by a decoder 230 of the ASR model 200, a sequence of hypothesized sub-word units $Y_L$ corresponding to a final speech recognition result 232 for the utterance 12, the sequence of hypothesized sub-word units $Y_L$ forming one or more words of the utterance. Here, each hypothesized sub-word unit is output from the decoder 230 at a corresponding output step.

Based on the biasing context vectors 262, the method 500 includes, at operation 508, generating, using a confidence estimation model (CEM) 300, a respective confidence output score 302 for each corresponding sub-word unit in the sequence of hypothesized sub-word units. In some examples, the sub-word units include wordpieces. In other examples, the sub-word units include graphemes or phonemes.

Figure 6:
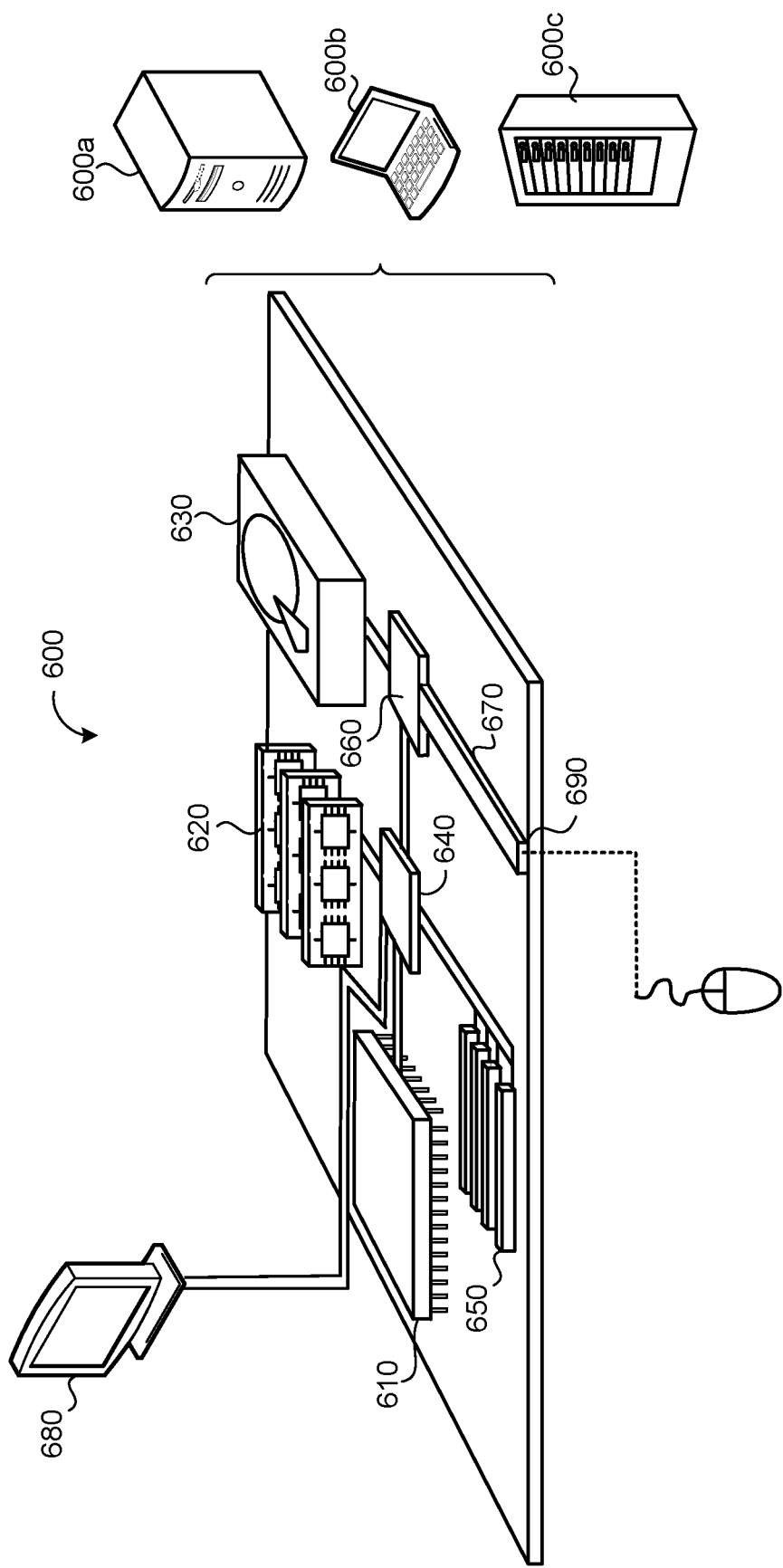
FIG. 6 is a schematic view of an example computing device that may be used to implement the systems and methods described herein.

FIG. 6 is schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. An automatic speech recognition (ASR) system comprising:
   an ASR model comprising:
      an audio encoder configured to encode a sequence of audio frames characterizing a spoken utterance into a sequence of higher-order feature representations; and
      a decoder configured to receive the sequence of higher-order feature representations and output a final speech recognition result;
   a neural associative memory (NAM) biasing model configured to receive biasing contextual information and modify the sequence of higher-order feature representations based on the biasing contextual information to generate, as output, biasing context vectors to encourage the decoder to recognize biasing phrases indicated by the biasing contextual information; and
   a confidence estimation model (CEM) configured to compute a confidence of the final speech recognition result output by the decoder, wherein the CEM is connected to the biasing context vectors generated by the NAM biasing model.

2. The ASR system of claim 1, wherein the biasing phrases comprise rare words and out-of-vocabulary (OOV) terms not used to train the audio encoder and the decoder.

3. The ASR system of claim 1, wherein the NAM biasing model and the CEM are trained separately.

4. The ASR system of claim 3, wherein the CEM is trained on training biasing context vectors that correspond to higher-order feature representations encoded by the audio encoder from input audio frames that have been modified by the NAM biasing model based on biasing contextual information extracted from training utterances for input to the NAM biasing model.

5. The ASR system of claim 1, wherein the NAM biasing model is initially trained on top of the ASR model and the CEM is trained on training data on top of the initially trained NAM neural biasing model.

6. The ASR system of claim 5, wherein the CEM randomly samples contextual information from the training data.

7. The ASR system of claim 1, wherein the audio encoder comprises a cascaded encoder architecture having a causal encoder and a non-causal encoder.

8. The ASR system of claim 1, wherein the audio encoder comprises a stack of multi-headed attention layers.

9. The ASR system of claim 8, wherein the stack of multi-headed attention layers comprises a stack of conformer layers or transformer layers.

10. The ASR system of claim 1, wherein the CEM comprises a multi-headed attention block having self-attention and acoustic cross-attention.

11. A computer-implemented method when executed on data processing hardware causes the data processing hardware to perform operations comprising:
    receiving a sequence of acoustic frames characterizing an utterance spoken by a user;
    receiving biasing contextual information;
    performing, using an automatic speech recognition (ASR) model, speech recognition on the sequence of acoustic frames by:
       generating, by an audio encoder of the ASR model, a sequence of higher-order feature representations each associated with a corresponding acoustic frame in the sequence of acoustic frames;
       modifying, by a neural associative memory (NAM) biasing model, using the biasing contextual information, the sequence of higher-order feature representations to generate a corresponding sequence of biasing context vectors; and
       based on the biasing context vectors, generating, by a decoder of the ASR model, a sequence of hypothesized sub-word units corresponding to a final speech recognition result for the utterance, the sequence of hypothesized sub-word units forming one or more words of the utterance, each hypothesized sub-word unit output from the decoder at a corresponding output step; and
    based on the biasing context vectors, generating, using a confidence estimation model (CEM), a respective confidence output score for each corresponding sub-word unit in the sequence of hypothesized sub-word units.

12. The computer-implemented method of claim 11, wherein:
    the biasing context vectors encourage the decoder to recognize any biasing phrases indicated by the biasing contextual information; and
    the biasing phrases comprise rare words and out-of-vocabulary (OOV) terms not used to train the audio encoder and the decoder.

13. The computer-implemented method of claim 11, wherein the NAM biasing model and the CEM are trained separately.

14. The computer-implemented method of claim 13, wherein the CEM is trained on training biasing context vectors that correspond to higher-order feature representations encoded by the audio encoder from input audio frames that have been modified by the NAM biasing model based on biasing contextual information extracted from training utterances for input to the NAM biasing model.

15. The computer-implemented method of claim 11, wherein the NAM biasing model is initially trained on top of the ASR model and the CEM is trained on training data on top of the initially trained NAM neural biasing model.

16. The computer-implemented method of claim 15, wherein the CEM randomly samples contextual information from the training data.

17. The computer-implemented method of claim 11, wherein the audio encoder comprises a cascaded encoder architecture having a causal encoder and a non-causal encoder.

18. The computer-implemented method of claim 11, wherein the audio encoder comprises a stack of multi-headed attention layers.

19. The computer-implemented method of claim 11, wherein the sub-word units comprise wordpieces.

20. The computer-implemented method of claim 11, wherein the operations further comprise:
    for each of the one or more words formed by the sequence of hypothesized sub-word units, determining a respective word-level confidence score for the word, the respective word-level confidence score equal to the respective confidence output score generated for the final sub-word unit in the word; and
    determining an utterance-level confidence score for the speech recognition result by aggregating the respective word-level confidence scores determined for the one or more words of the utterance.

\* \* \* \* \*